United States Patent [19]

Podell

[11] 4,396,159
[45] Aug. 2, 1983

[54] PROTECTIVE GUIDE STRUCTURE FOR PREVENTING INADVERTENT ACTUATION OF A FOOD PROCESSOR WITH A TILTED COVER

[75] Inventor: Allen F. Podell, Palo Alto, Calif.

[73] Assignee: Cuisinarts, Inc., Greenwich, Conn.

[21] Appl. No.: 237,877

[22] Filed: Feb. 25, 1981

[51] Int. Cl.³ .................... B02C 18/16; B02C 23/04
[52] U.S. Cl. .................................................. 241/37.5
[58] Field of Search ............ 241/36, 37.5, 92, 199.12, 241/282.1, 282.2

[56] References Cited

U.S. PATENT DOCUMENTS

| | | | |
|---|---|---|---|
| D. 254,161 | 2/1980 | Verdun | 241/282.1 X |
| 3,985,304 | 10/1976 | Sontheimer | 241/92 |
| 4,113,188 | 9/1978 | Belinkoff | 241/282.1 X |
| 4,184,641 | 1/1980 | Coggioca | 241/37.5 |
| 4,213,570 | 7/1980 | Jones | 241/282.1 X |

Primary Examiner—Howard N. Goldberg
Attorney, Agent, or Firm—Parmelee, Bollinger & Bramblett

[57] ABSTRACT

A protective guide and blocking structure are provided for preventing inadvertent actuation by a misaligned or tilted cover on a food processor of the type including tool drive means driven by a motor located in a base with control means for rendering the motor drive inoperative unless the control means is actuated. When the components of the food processor are properly positioned, the control means becomes actuated to permit operation of the motor drive for rotating the tool. The actuating means is a movable rod in a boss on the bowl defining a guideway through which the rod moves. The boss has a keyway-configured, slotted cap covering the upper end of the rod, and the actuator has a surface with a keyway therein which fits into the slotted cap and is capable of passing therethrough for depressing the movable rod. The protective apparatus in accordance with the present invention includes a vertical rib which partially extends upwardly along the rear front edge of the keyway-configured slot. A cooperating recessed shoulder is provided on the inside of the complementary keyway-configured actuator such that the recessed shoulder contacts and engages the vertical rib for preventing the actuator from entering the protective cap when the actuator is improperly aligned in the cap, thus preventing the cover from being misaligned or tilted on the bowl. A radial ledge on the bowl diametrically opposite the movable rod and a complementary lug on the cover further insure proper alignment of the cover.

7 Claims, 7 Drawing Figures

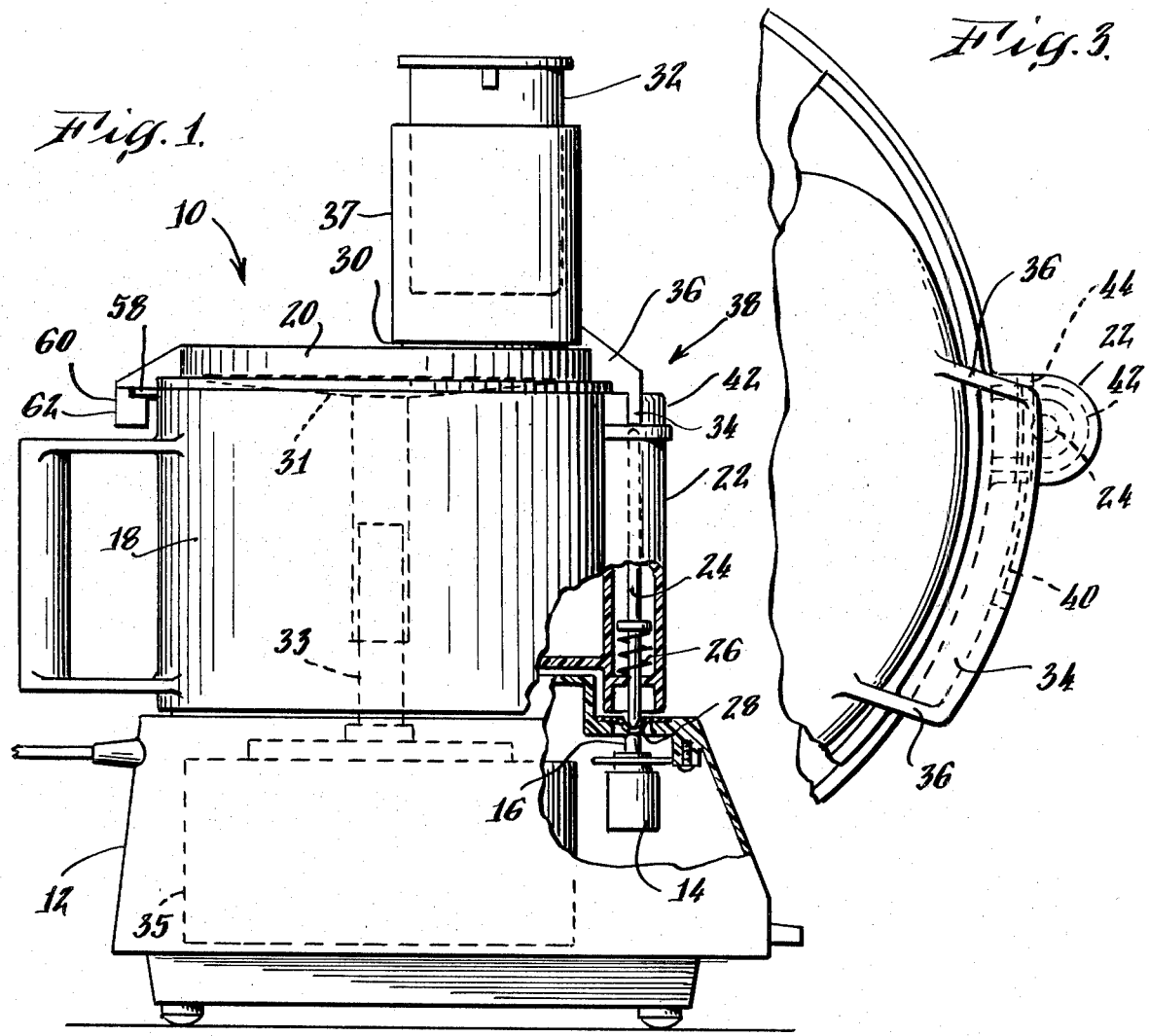
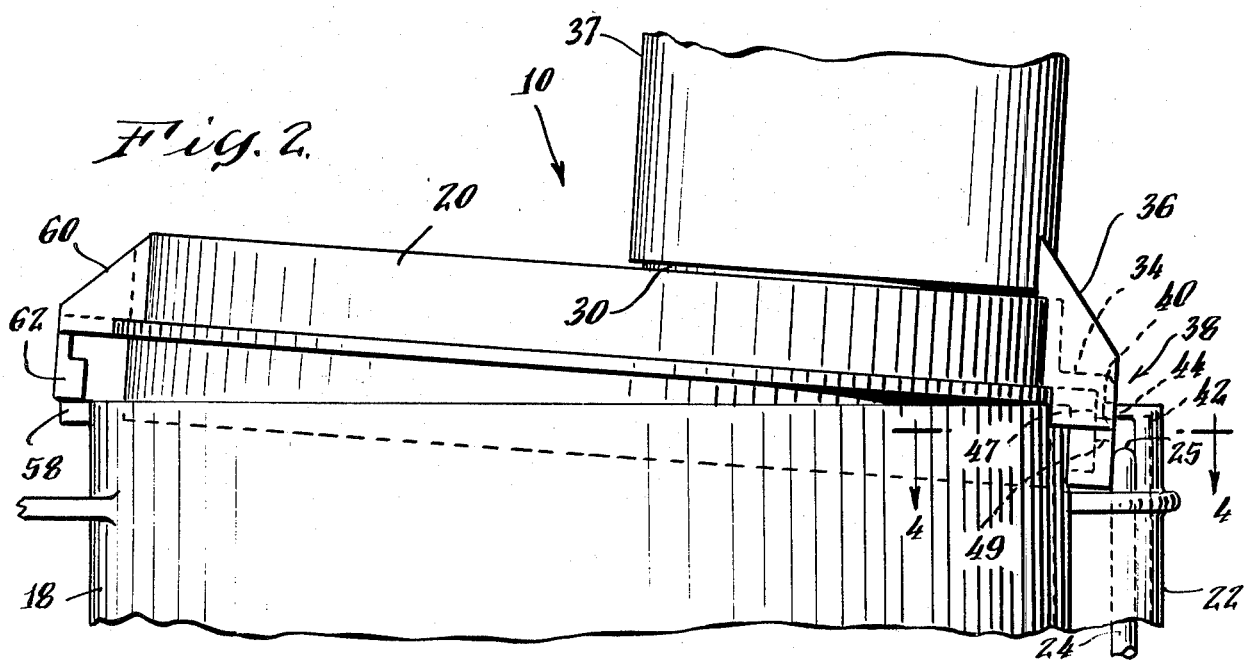

PROTECTIVE GUIDE STRUCTURE FOR PREVENTING INADVERTENT ACTUATION OF A FOOD PROCESSOR WITH A TILTED COVER

BACKGROUND OF THE INVENTION

This invention relates to food processors, and more particularly to protective guide, alignment blocking apparatus for such machines in which an activator element must be properly aligned in order to be inserted into a keyway configured slot enbling the operation of the food processor and preventing its operation when the cover is tilted, misaligned or improperly inserted on the bowl for protecting the user as well as the machine from accidental actuation when the components of the food processor are not properly in place.

The food processors of the type in which the present invention is applicable have a working bowl with tool mounting means projecting upwardly in the bowl on which various selected rotary food processing tools can be mounted to be driven for performing various food processing operations in accordance with the desires of the user. A removable cover is secured over the top of the bowl during use and includes a feed tube having a mouth that opens downwardly through the cover into the top of the bowl. The food items to be processed are placed in this feed tube and are then manually pushed down through the feed tube into the bowl by means of a removable food pusher which is adapted to slide down in the manner of a plunger through the feed tube.

Such a food processor is shown in and described in U.S. Pat. No. 3,892,365—Verdun. This patent also discloses a safety feature in providing a vertical movable rod housed in a semicylindrical boss which extends vertically the height of the bowl and encloses the operating rod which is aligned with and is adapted to actuate an on/off switch for controlling the motor. The operating rod is spring biased upwardly to prevent depressing the motor switch unless the detachable cover is positioned on the working bowl. A cam is mounted on the rim of the cover which is adapted to depress the top end of the operating rod to actuate the motor switch. This motor switch is not intended to be actuated unless the cover is properly positioned on the bowl.

More recently there has been commercially offered for sale a food processor in which such a cam is mounted on an outer sleeve which fits down over the feed tube on the cover. Thus, the operating rod is not actuated unless the cover is properly positioned on the bowl and the outer sleeve is also fitted down over the feed tube.

SUMMARY OF THE INVENTION

It is an object of the present invention to provide a new and improved food processor in which the operation of a food processor is prevented when the cover is tilted by the user when applying the cover to the bowl unless the actuator on the cover or the outer sleeve carrying the actuator is properly in place.

A further object of this invention is to provide a new and improved food processor in which the cover is secured on diametric positions across the bowl when manually positioned on the bowl by the user to insure proper positioning of the cover on the bowl enabling the operation of the food processor in a safe manner and preventing inadvertent injury either to the user or the food processor.

In carrying out this invention, in one illustrative embodiment thereof, a food processor is provided of the type including a tool drive means which is driven by a motor and a base having control means for rendering the motor drive inoperative unless the control means is actuated. A bowl is mounted on the base for enclosing a rotary tool within the bowl and a movable operating rod is associated with the bowl for actuating the control means when this rod is depressed. The rotatable tool is drivable by the tool drive means. A removable cover for the bowl has a food receiving feed tube extending through the cover into contact with the rotating tool in the bowl and a food pusher is insertable into this feed tube for pushing food items downwardly in the feed tube toward the rotating tool.

An actuator is positioned on the cover and a semicylindrical boss on the bowl forms a guideway in which said movable operating rod is housed in alignment with the control means. The boss has a keyway configured, slotted cap covering the upper end of the operating rod thereby preventing access to the rod to prevent an accidental actuation of the control means when the components of the food processor are not properly positioned. The actuator means has a surface with a keyway therein which fits into and is capable of passing through the configured slot in the cap for depressing the movable rod for actuating the control means. The keyway configured, slotted cap is provided with a vertical rib partially extending upwardly along the rear front edge of the keyway. The actuator means has a recessed shoulder on the inside of the complementary keyway which fits into the slotted cap. The recessed shoulder cooperates with said vertical rib for preventing the actuator from entering the protective cap when the actuator means is improperly aligned on the cap thereby preventing the cover from being misaligned or tilting upward on the bowl at the side diametrically across from the actuator means. The cover also includes a radial ledge positioned on the bowl substantially diametrically opposite the actuating element and a complementary depending lug is mounted on the cover which is adapted to engage the radial ledge for holding the cover on the bowl at a position across from the position where the actuator means holds the cover on the bowl when engaging the moving operating rod. The depending lug is also provided with an elevated stop positioned thereunder which requires the elevation of the cover above the ledge in order to turn the cover when the lug is not in proper alignment to receive the ledge whereby in such a position the rotated tilted cover is incapable of actuating the movable operating rod due to the engagement of the vertical rib with the recessed shoulder before the actuator means can engage the movable operating rod.

The actuator means may be advantageously integrally mounted on the cover or may be a part of the outer sleeve which fits down over the feed tube in nesting relationship thereon. Among the advantages provided by the present invention are those resulting from the fact that the cover is secured on diametrically opposed sides of the bowl when in proper operating position and when the machine is running insuring that the cover will not move during the operation of the food processor. Furthermore, if the cover is tilted so high that it is capable of being rotated on the bowl, the combined elevated stop, vertical rib and recessed shoulder structure will prevent the actuation of the operating rod, and accordingly prevent the operation of the food processor and thereby insure that the cover is properly positioned on the bowl before the food processor is operable thereby preventing inadvertent injury either to the user or to the food processor and insuring that the cover is properly positioned on the bowl to enhance the proper performance of the food processing function.

BRIEF DESCRIPTION OF THE DRAWINGS

The invention, together with further objects, features, aspects and advantages thereof will be more clearly understood from a consideration of the following description taken in conjunction with the accompanying drawings in which the same reference numbers are used to refer to corresponding elements throughout the various views.

FIG. 1 is a side elevational view, partly broken away and in section of a food processor embodying the present invention in which the actuator is the part of an outer sleeve which fits down over the feed tube in nesting relationship thereon.

FIG. 2 is an enlarged side view of the cover and actuator of FIG. 1 in which the cover is improperly positioned on the bowl, the protective apparatus embodying the present invention preventing the actuation of the food processor in such a position.

FIG. 3 is a partial top view of FIG. 2 illustrating the prevention of the actuation of the food processor by the protective apparatus embodied in the present invention when the cover is improperly positioned thereon as illustrated in FIG. 2.

DESCRIPTION OF THE PREFERRED EMBODIMENT

Figure 4:
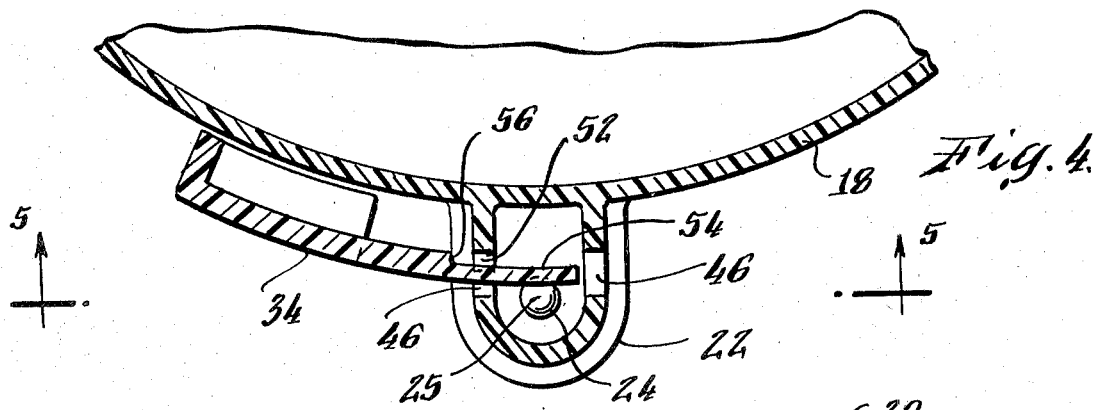
FIG. 4 is a cross sectional view taken along lines 4—4 of FIG. 2.

Referring now to FIG. 1, a food processor, referred to generally with the reference character 10, is illustrated having a base housing 12 with a working bowl 18 mounted thereon. The top of the bowl 18 is closed by a cover 20 which is arranged to be engaged and fastened in secure relationship in its normal operating position on the bowl 18 whenever the food processor 10 is in operation. Standing upwardly from the cover 20 is a food receiving hopper or feed tube 30 which opens downwardly through the cover 20. In the embodiment illustrated in FIG. 1 an outer sleeve 37 is positioned on the cover 20 and fits over the feed tube 30 in nesting relationship thereon and carries an actuator 38 which will be described hereinafter. As has been stated the actuator 38 may be carried directly on the cover or on an outer sleeve 37 as shown in FIG. 1. The feed tube 30 is designed to receive a food pusher 32 which is manually insertable in the manner of a plunger and is employed to push food items down into engagement with a rotary tool 31 mounted on a tool mounting means 33 for rotation in the bowl 18.

As is more fully described and shown in the aforesaid Verdun patent, the housing 12 contains a relatively powerful electric motor 35 for driving the tool mounting means 33 extending upwardly from the housing 12 into the working bowl 18. A variety of different types of food processing tools 31 are provided which may be selectively mounted on the tool mounting means 33 for rotation within the bowl. Since the tool and the tool drive mechanism form no part of the present invention and are conventional one example of which is illustrated in the Verdun patent, they are not shown or described in detail here.

Figure 5:
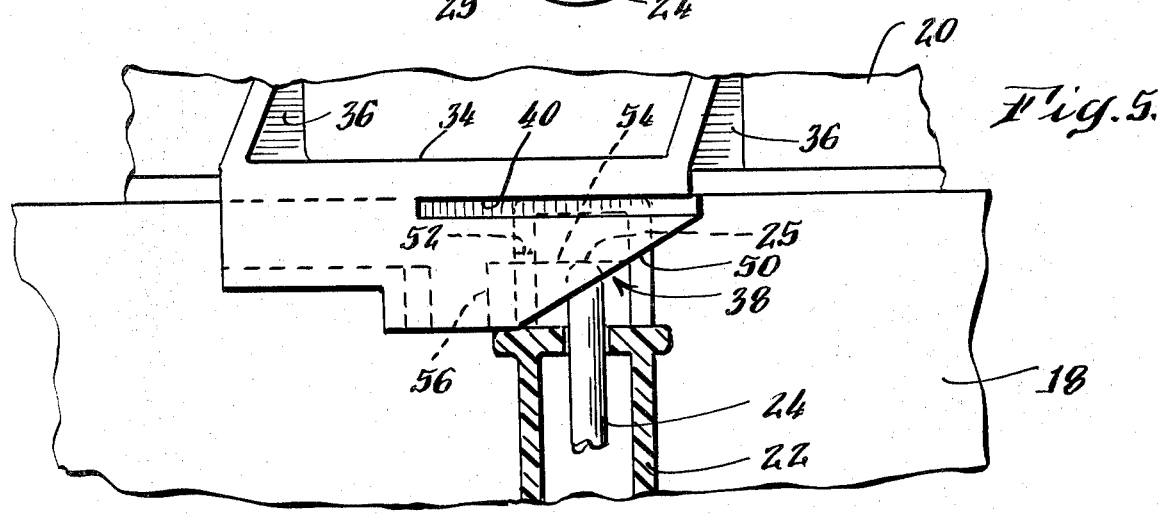
FIG. 5 is a partial elevational sectional view taken along lines 5—5 of FIG. 4 showing an enlarged front view of the actuator element being prevented from actuating the operating rod of the food processor when the cover is inadvertently mounted on the bowl in tilted position as shown in FIG. 2.

As will be seen in FIG. 1, a vertical semi-cylindrical boss 22 is formed on the outside of the wall of the bowl 18. The boss 22 defines a guideway in which is carried a vertically movable operating rod 24. The rod 24 is normally urged upward by means of a spring 26. When the bowl 18 is properly positioned on the housing 12, the operating rod 24 is aligned with an actuating button 16 of tool drive control means 14, for example, a motor switch. There is a flexible liquid tight membrane 28 in the base housing 12 above the control means 14 for protecting the interior of this housing from entry of liquids or food particles. Either the cover 20 or the outer sleeve 37 as illustrated in FIG. 1 which is positioned on the cover carries an annular flange 34 (see FIG. 3) along one side thereof which is at a lower elevation than the lower end of the cover or of the outer sleeve 37. Flange 34 is provided with additional support by upwardly extending stiffening ribs 36. The annular flange 34 carries a downwardly extending actuator or cam 38 (see FIGS. 5 and 7) which is adapted when the cover is positioned properly on the bowl 18 and is rotated, to contact and depress the vertically movable operating rod 24 to actuate the motor 35 of the food processor 10 thereby rotating the tool 31 in the bowl.

It is to be noted that this particular structure with the actuator in the form of an annular flange and with a cam extending from the cover is shown in the aforesaid Verdun patent. When such a cam is mounted on an outer sleeve which fits over the feed tube, one such form of structure is shown and described in copending U.S. Pat. No. 4,226,373, which is assigned to the assignee of the present invention. In order to protect the upper end 25 of the actuator rod 24 and to make it difficult to inadvertently or accidentally actuate this operating rod, a keyway, slotted protector cap 42 is mounted on the top of the boss 22 surrounding the upper end 25. The slotted protector 42 has a narrow top slot 44 therethrough and has a pair of opposed, aligned side wall slots 46 which extend completely through the cap (see FIG. 4). The top slot 44 is preferably slightly curved and is corresponding in curvature to the curvature of the rim of the cover 20. In other words, the top slot 44 preferably has a curvature which is concentric about the central axis of the working bowl and its cover. This top slot 44 is considerably narrower than the side wall slots 46.

The narrow slot 44 in cooperation with the enlarged side wall slots 46 define a specifically configured access opening in the nature of a keyway slot such that inadvertent or accidental access to the top end 25 of the actuator rod 24 is prevented and access thereto can only be obtained by a cam member having a complementary keyway shaped configuration. Consequently, the motor drive unit in the food processor base housing 12 cannot readily be actuated except by a cam having an appropriate keyway shaped configuration. This will best be seen in FIGS. 2 and 7, the downwardly projecting cam 38 extending down from the annular flange 34 has a groove or keyway 40 in its side surface forming a thin web portion 47 of the cam which accurately fits into the narrow top slot 44 in the protective cap 42. Also, the enlarged lower portion 49 of the cam 38 accurately fits into the enlarged sidewall slots 46 which are located in the sidewalls of the protector cap 42. The lower edge of the cam 38 is inclined as is seen in FIG. 7 for providing a cam surface 50 to provide a positive means for depressing the push rod 24 when the narrow web 47 and the enlarged lower portion 49 of the cam 38 are inserted into the keyway configured top slot 44 and sidewall slots 46.

The present invention provides a vertical rib 52 which partially extends vertically upwardly along the inner edge of the leading slot 46 of the keyway-slotted protector cap 42 (see FIGS. 4-7). The cam 38 also includes a cooperating recess 54 terminating in a recessed shoulder 56 (see FIGS. 4-7).

The purpose of this complementary structure of (i) the upright vertical rib 52 on the entry way into the slotted protector cap 42 along with (ii) the recess 54 and (iii) the recessed shoulder 56 is to prevent actuation of the motor drive in the food processor if the actuator cam 38 is not properly positioned on the cover 20 or if the cover 20 is tilted or is in misalignment on the bowl. If there is any such incorrect positioning or tilting of the cover, the upstanding vertical rib will prevent the entry of the cam into the slotted cap sufficiently far to actuate the push rod 24. An example of this is shown in FIG. 4 in which the vertical rib 52 enters the recess 54, and with further rotation of the cover would contact the recessed shoulder 56 on the cam 36, thereby preventing the cam from fully entering the protective cap 42 and thus preventing the cam surface 50 from significantly depressing the push rod 24.

Figure 6:
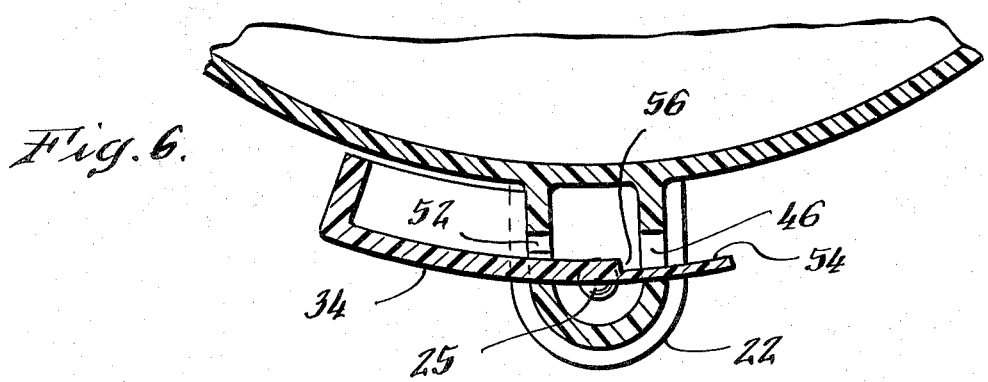
FIG. 6 is a top cross sectional view of the actuating mechanisms of the food processor when the cover is properly latched on the bowl.
Figure 7:
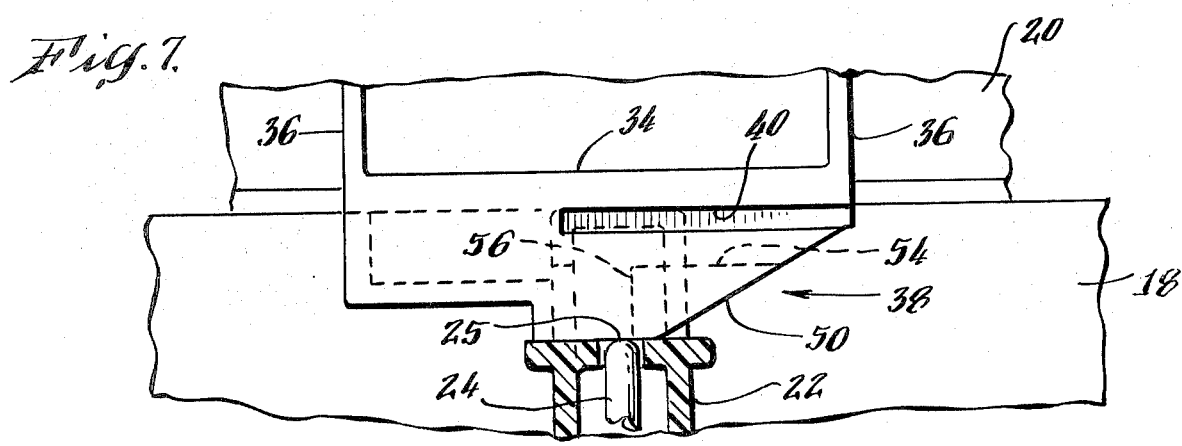
FIG. 7 is a front view of FIG. 6 illustrating the actuating mechanism of the food processor when the cover is properly latched on the bowl.

On the other hand as shown in FIGS. 6 and 7, when the actuator cam 38 is properly positioned, then the recess 54 is in proper alignment for the vertical rib 52 to clear the recess and to by-pass beyond the recessed shoulder 56, thereby allowing the cam surface 50 to ride fully over the end 25 of the operating rod for depressing the operating rod to permit actuation of the motor drive, and also securely latching the cam within the slotted cap in its fully inserted properly aligned position.

In addition to this guide and alignment structure provided by the rib 52 and the recess 54 together with the recessed shoulder 56 there are a radial ledge 58 and a depending lug 60 located substantially diametrically across the cover from the cam 38, whether this cam be positioned directly on the cover 20 or on an outer sleeve 37 positioned over the feed tube. The ledge 58 and lug 60 secured on the opposite side of the cover will insure that the cover is firmly secured on opposite sides of the bowl. On the other hand, if the user fails to properly secure the depending lug 60 to the radial ledge 58, a protective measure is provided in the form of an elevated stop 62 (see FIGS. 1 or 2) which performs the function of elevating or tipping the cover the distance of the stop above the depending ledge 58 which will insure that the cover is tilted enough so that when the cam 38 is moved into the slotted cap 42 that the upstanding vertical rib 52 will be forced to contact the recess shoulder 56 in order to prevent the operation of the push rod 24. Accordingly, the food processor will be prevented from operating when the cover is tilted that much.

It is to be noted that the act of tilting the cover 20 causes the recess 54 to move into position where the internal shoulder 56 strikes suddenly against the blocking abutment provided by the vertical rib 52. Therefore, an advantageous sudden forceful and abrupt mechanical interference is produced, when the internal shoulder strikes the abutment, as distinguished from a gradually increasing impedance. This sudden, forceful, mechanical interference clearly alerts the user that the user should "WAIT!" because something is definitely amiss. On the other hand, a gradually increasing impedance would tend to encourage the user to exert more strength, under the impression that a frictional drag effect had been encountered. The sudden, forceful blockage is clearly distinguished from friction, and so the user is advantageously alerted to take a close look and thus to reposition the cover correctly.

As previously stated whether the keyway configured cam 38 is mounted on the cover 20 or is mounted on the sleeve 35 as illustrated in the drawings the actuator rod protection safety features provided by the present invention are the same in either embodiment. The term "actuator means" as associated with the cover is intended to be interpreted sufficiently broadly to include a food processor in which the actuator means is mounted directly on the cover per se and also includes the structure in which the actuator means is mounted on an attachment such as an outer sleeve which fits down over the feed tube.

The control means 14 may be a switch or alternatively may serve to control the operation of a clutch in a motor drive for rendering the motor drive operative for driving the rotating tool. In such a case the motor may be turned on by a different switch and the clutch actuated by the control means. Accordingly, the term "control means" and motor drive are intended to be interpreted sufficiently broadly to include either of these control arrangements for rendering the motor drive operative. It would also be apparent that the cam 38 may operate directly on the actuating button 16 instead of using the push rod 24 as indicated or the button 16 may be elongated. In any of these arrangements the purpose of the applicant's guide, blocking and protective structure is to insure that the cover is firmly secured on the bowl of the food processor in order to operate that processor in a safe, convenient manner.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. In a food processor of the type including tool drive means drivable by a motor drive located in a base with control means for rendering the motor drive inoperative unless said control means is actuated, a bowl mountable on said base for enclosing a rotatable tool within said bowl, said tool being drivable by said tool drive means, a movable actuating element for operating said control means when the outer end of said actuating element is depressed, a removable cover for said bowl, a food-receiving hopper extending through the cover for feeding food items through the cover to the tool in the bowl, and a food pusher manually insertable into said hopper for pushing the food items in said hopper toward the rotating tool, actuator means associated with said cover, a protector cap covering the outer end of said actuating element for preventing access to said actuating element to prevent inadvertent or accidental actuation of said control means, said protector cap having an access opening therein of predetermined key-shaped configuration, and said actuator means having a complementary keyway-shaped configuration which fits into said access opening and is capable of depressing said movable actuating element for thereby actuating said control means, protective apparatus for preventing inadvertent actuation of the control means by a misaligned or tilted cover, said protective apparatus comprising:

a vertical rib partially extending upwardly along the edge of said key-shaped configured access opening first entered by said actuator means, a recessed shoulder on the inside of said complementary keyway-shaped configuration of said actuator means, said recessed shoulder contacting said rib and preventing said actuator means from entering said protector cap when said actuator means is improperly aligned in said cap, thereby preventing a misaligned or tilting cover on said bowl from causing actuation of said control means for the motor drive.

2. In a food processor, the protective apparatus as set forth in claim 1 in which:

a radial ledge is positioned on said bowl substantially diametrically opposite said actuating element, a complementary depending lug is mounted on the rim of said cover substantially diametrically opposite said actuator means, said lug is adapted to engage said radial ledge for holding said cover horizontally on said bowl at a position across from the position where said actuator means holds said cover on said bowl when said actuator means is fully inserted into said access opening for engaging and moving said movable actuating element, and said lug extends down below the level of said rim of said cover to approximately the same level as said actuator means for causing the cover to tilt significantly if said lug does not engage said radial ledge for preventing inadvertent actuation by a misaligned or tilted cover.

3. In a food processor, the protective apparatus as set forth in claim 2 in which said depending lug includes an elevated stop positioned thereunder which would require relatively large and noticeable tilting elevation of the cover above said ledge in order to be able to turn said cover when said lug is not in proper alignment to receive said ledge, whereby the rotated, tilted cover can not actuate said movable actuating element due to the engagement of said vertical rib with said recessed shoulder before said actuator means can move said movable actuating element.

4. In a food processor, the protective apparatus as set forth in claims 1 or 3 in which said actuator means is an integral part of said cover for said bowl.

5. In a food processor, the protective apparatus as set forth in claim 1 or 3 in which said actuator means is mounted on and extends downwardly and radially outwardly from an outer sleeve which is positionable on said cover over said food-receiving hopper.

6. In a food processor of the type including tool drive means drivable by a motor drive located in a base with control means for rendering the motor drive inoperative unless said control means is actuated, a bowl mountable on said base for enclosing a rotatable tool within said bowl, said tool being drivable by said tool drive means, a movable actuating element for operating said control means when the outer end of said actuating element is depressed, a removable cover for said bowl, a food-receiving hopper for feeding food items to the tool in the bowl, a food pusher manually insertable into said hopper for pushing the food items in said hopper toward the rotating tool, actuator means associated with said cover, a protector cap covering the outer end of said actuating element for preventing access to said actuating element to prevent inadvertent or accidental operation of said control means, said protector cap having the shape of an inverted cap with a top wall and side walls, said protector cap having a narrow top slot in its top wall and having a pair of enlarged slots located in its opposite side walls and being aligned with each other, said actuator means having an enlarged portion for engaging and moving the outer end of said movable actuating element, said enlarged portion being arranged to enter into said enlarged side wall slots, and said actuator means having a thin web attached to said enlarged portion, said thin web being arranged to enter into said narrow top slot, protective apparatus for preventing inadvertent actuation of said control means comprising:

an outer vertical rib extending vertically along the edge of said enlarged side wall slot in said protective cap which first receives said actuator means, and a recess terminating in a recessed shoulder located in the inner wall of said actuator means for thereby permitting said actuator means to enter said enlarged side wall slot and move therein in a predetermined guided position for depressing said actuating element for operating the control means when the cover is placed on the bowl horizontally and turned to its proper mounted position, and said vertical rib and recessed shoulder preventing the insertion of said actuator means sufficiently far into said enlarged side wall slot to engage and depress said movable actuating element when there is a tilted or misaligned position of said actuator means with respect to said protective cap for preventing rotation of the tool by said motor drive, unless the cover is placed on the bowl horizontally and turned to the proper mounted position.

7. In a food processor, the protective apparatus as claimed in claim 6, including:

a radial ledge positioned on said bowl substantially diametrically opposite said actuating element, a complementary depending lug having an elevated stop thereunder, said lug being mounted on said cover and being adapted to engage beneath said ledge when said cover is properly positioned on said bowl, said elevated stop extending down below the cover sufficiently far for tilting said cover above said bowl when said lug fails to engage beneath said ledge, for thereby insuring that said vertical rib engages said recessed shoulder at such an angle that further turning of the cover relative to the bowl cannot occur, and consequently said actuator means is prevented from engaging said actuator element to prevent the inadvertent or accidental improper actuation of said food processor when the cover is not horizontal on the bowl.

* * * * *